(12) United States Patent
Yuen et al.

(10) Patent No.: US 12,295,279 B2
(45) Date of Patent: May 13, 2025

(54) SYSTEM FOR MOVING DISTRIBUTION LINES OF A PRODUCT DISTRIBUTION SYSTEM

(71) Applicant: CNH INDUSTRIAL CANADA, LTD., Saskatoon (CA)

(72) Inventors: Cory A. Yuen, Saskatoon (CA); Matthew J. Stefaniuk, Saskatoon (CA); Gregory Johnson, Saskatoon (CA); Darwin L. Zacharias, Saskatoon (CA)

( * ) Notice: Subject to any disclaimer, the term of this patent is extended or adjusted under 35 U.S.C. 154(b) by 813 days.

(21) Appl. No.: 17/558,187

(22) Filed: Dec. 21, 2021

(65) Prior Publication Data
US 2023/0189685 A1    Jun. 22, 2023

(51) Int. Cl.
*A01C 7/08* (2006.01)
*A01B 73/06* (2006.01)
*A01C 5/06* (2006.01)

(52) U.S. Cl.
CPC ............ *A01B 73/067* (2013.01); *A01C 7/082* (2013.01)

(58) Field of Classification Search
CPC ....... A01B 73/005; A01B 73/067; A01C 5/06; A01C 7/20; A01C 7/102; A01C 7/081; A01C 7/082; A01C 7/084
See application file for complete search history.

(56) References Cited

U.S. PATENT DOCUMENTS

| | | | |
|---|---|---|---|
| 4,739,930 A | 4/1988 | Pask | |
| 4,843,983 A * | 7/1989 | Olson | F16L 37/58 |
| | | | 285/240 |
| 5,488,996 A | 2/1996 | Barry et al. | |
| 5,647,440 A | 7/1997 | Barry et al. | |
| 6,845,724 B2 * | 1/2005 | Mayerle | A01C 7/20 |
| | | | 221/211 |
| 7,347,149 B2 * | 3/2008 | Mayerle | A01C 7/06 |
| | | | 111/175 |
| 7,735,437 B2 * | 6/2010 | Pollington | F01N 3/02 |
| | | | 71/901 |
| 9,474,200 B2 | 10/2016 | Koch | |
| 9,986,674 B2 | 6/2018 | Sudbrink et al. | |
| 10,091,922 B2 | 10/2018 | Sudbrink et al. | |

* cited by examiner

*Primary Examiner* — Adam J Behrens
*Assistant Examiner* — Robert E Pezzuto
(74) *Attorney, Agent, or Firm* — Rebecca Henkel; Peter K. Zacharias; Rickard K. DeMille

(57) ABSTRACT

An agricultural implement includes a frame including a center section and a first wing section and a second wing section flanking the center section. The first wing section and the second wing section are configured to move relative to the center section during transitions between a folded position and an unfolded position. The agricultural implement includes a first rigid tube assembly disposed on the center section having a first set of rigid tubes and a second set of rigid tubes, a second rigid tube assembly disposed on the first wing section, and a third rigid tube assembly disposed on the second wing section. The agricultural implement includes a structural support configured to enable movement of the first set of rigid tubes and the second set of rigid tubes relative to the center section and each other during the transitions between the folded position and the unfolded position.

20 Claims, 8 Drawing Sheets

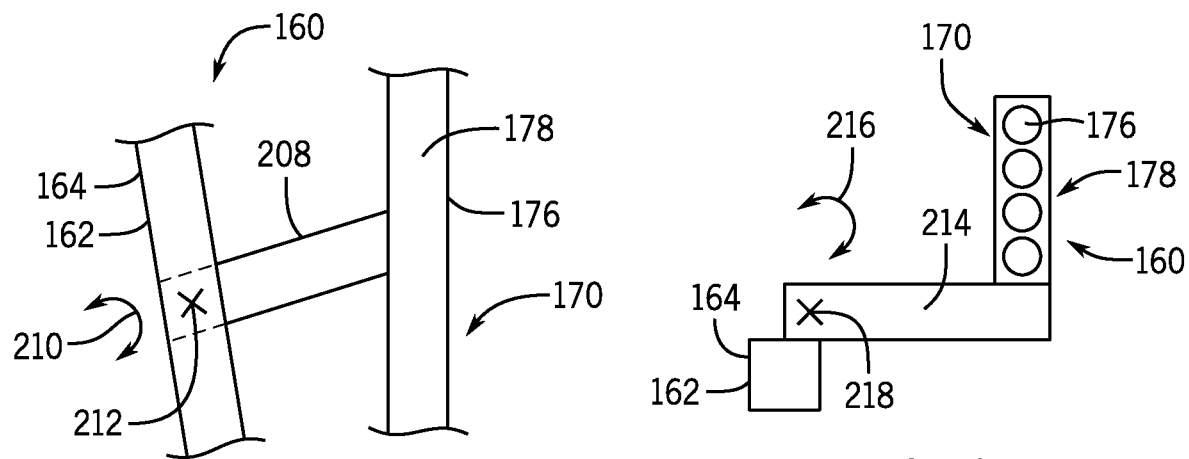
FIG. 7
FIG. 8
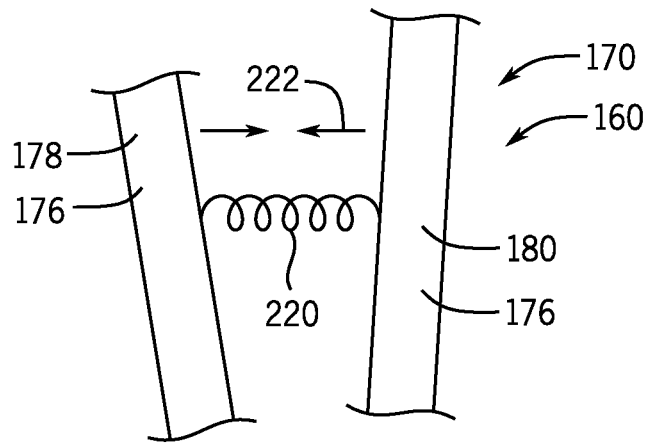
FIG. 9

SYSTEM FOR MOVING DISTRIBUTION LINES OF A PRODUCT DISTRIBUTION SYSTEM

BACKGROUND

The present disclosure relates generally to an agricultural product distribution system and, more specifically, a system for moving distribution lines for the agricultural product distribution system.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement from a centralized location, such as an air cart. In certain embodiments, the air cart may be connected in series with the seeding implement (e.g., in front of or behind the seeding tool to form a multi-implement train). The air cart may generally include a storage tank (e.g., a pressurized tank) having separate compartments for different product types (e.g., seed, fertilizer, etc.), an air source (e.g., a blower), and a metering assembly. More specifically, the granular products (seeds, fertilizer, etc.) may be gravity fed from the storage tank into the metering assembly, which distributes a desired flow rate of the granular products to each of the row units. For example, the air source may generate an air stream and the metering assembly may control flow of granular products into the air stream such that the granular products are entrained in the air stream. The air stream may then be supplied to each of the row units via primary lines (e.g., hoses) and secondary lines (e.g., hoses) fluidly coupled between the metering assembly and the row units, thereby delivering the granular products to each of the row units for deposition. The primary lines may be lengthy and subject to be being caught or crushed between components of the seeding implement during transitions between working and transport positions for the seeding implement.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, an agricultural implement for an agricultural product distribution system is provided. The agricultural implement includes a frame including a center section and a first wing section and a second wing section flanking the center section, wherein the first wing section and the second wing section are configured to move relative to the center section during transitions between a folded position and an unfolded position. The agricultural implement also includes a first rigid tube assembly disposed on the center section having a first set of rigid tubes and a second set of rigid tubes. The agricultural implement also includes a second rigid tube assembly disposed on the first wing section. The agricultural implement further includes a third rigid tube assembly disposed on the second wing section. The agricultural implement even further includes a first set of flexibles hoses coupling the first set of rigid tubes to the second rigid tube assembly. The agricultural implement still further includes a second set of flexible hoses coupling the second set of rigid tubes to the third rigid tube assembly. The agricultural implement yet further includes a structural support disposed on the center section, wherein the first rigid tube assembly is disposed on the structural support, and the structural support is configured to enable movement of the first set of rigid tubes and the second set of rigid tubes relative to the center section and each other during the transitions between the folded position and the unfolded position.

In certain embodiments, an agricultural product distribution system is provided. The agricultural product distribution system includes a first rigid tube assembly configured to be disposed on a center section of a frame of an agricultural implement, the frame including the center section and a first wing section and a second wing section flanking the center section, and the first wing section and the second wing section being configured to move relative to the central section during transitions between a folded position and an unfolded position, wherein the first rigid tube assembly has a first set of rigid tubes and a second set of rigid tubes. The agricultural product distribution system also includes a second rigid tube assembly configured to be disposed on the first wing section and coupled to the first set of rigid tubes and a third rigid tube assembly configured to be disposed on the second wing section and coupled to the second set of rigid tubes. The agricultural product distribution system further includes a structural support configured to be disposed on the center section, wherein the first rigid tube assembly is disposed on the structural support, and the structural support is configured to enable movement of the first set of rigid tubes and the second set of rigid tubes relative to the center section and each other during the transitions between the folded position the unfolded position.

In certain embodiments, a system for movement of distribution lines of an agricultural product distribution system is provided. The system includes a first rigid tube assembly configured to be disposed on a center section of a frame of an agricultural implement, the frame including the center section and a first wing section and a second wing section flanking the center section, and the first wing section and the second wing section being configured to move relative to the central section during transitions between a folded position and an unfolded position, wherein the first rigid tube assembly has a first set of rigid tubes and a second set of rigid tubes. The system also includes a second rigid tube assembly configured to be disposed on the first wing section and coupled to the first set of rigid tubes and a third rigid tube assembly configured to be disposed on the second wing section and coupled to the second set of rigid tubes. The system further includes a track configured to be disposed on the center section, wherein the first rigid tube assembly is disposed on the structural support, and the first set of rigid tubes and the second set of rigid tubes are configured to move relative to the center section and each other by sliding on the track during the transitions between the folded position the unfolded position.

DRAWINGS

These and other features, aspects, and advantages of the present disclosure will become better understood when the following detailed description is read with reference to the accompanying drawings in which like characters represent like parts throughout the drawings, wherein:

FIG. 7 is schematic top view of a rigid tube assembly coupled to a frame via a structural support (e.g., utilizing a vertical axis rotation with an arm), in accordance with an embodiment;

FIG. 8 is a schematic end view of a rigid tube assembly coupled to a frame via a structural support (e.g., utilizing a vertical axis rotation with an arm), in accordance with an embodiment;

FIG. 9 is a schematic top view of a rigid tube assembly having a spring, in accordance with an embodiment;

DETAILED DESCRIPTION

Figure 1:
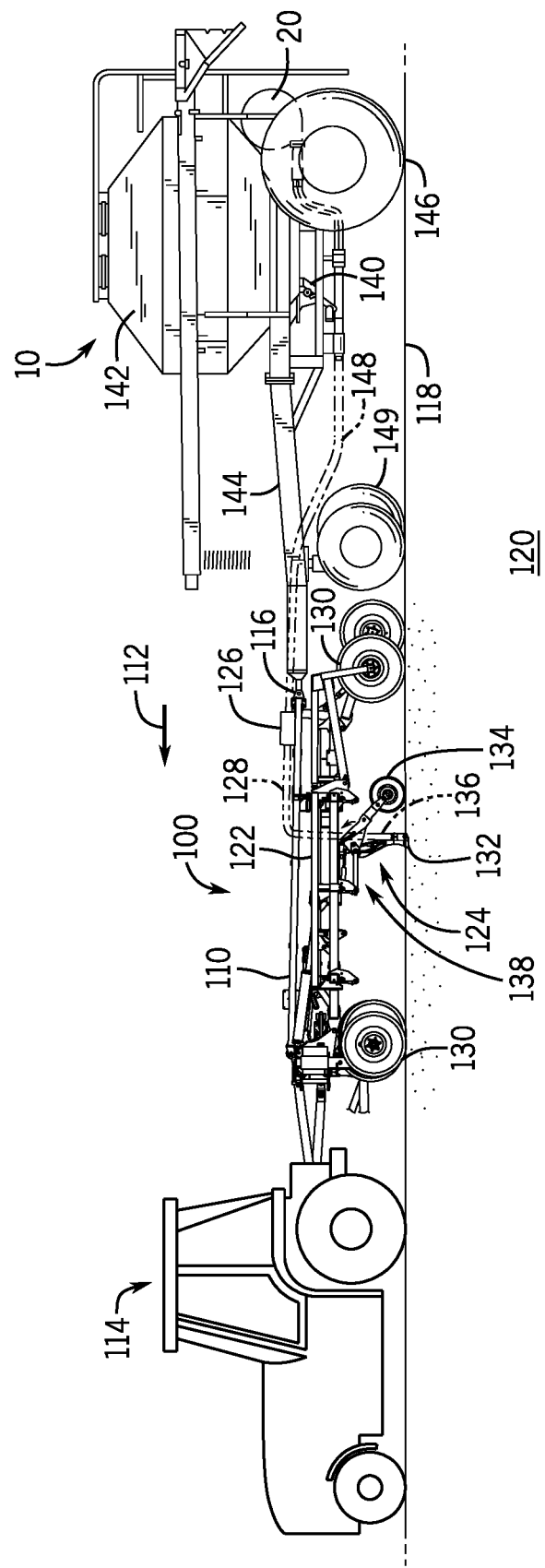
FIG. 1 is a side view of an agricultural material application system utilizing a folding apparatus, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Generally, an agricultural product distribution system may include a towable agricultural implement to deposit a granular product into the soil. As used herein, the granular product may be any suitable particulate material that is desired to be deposited into the ground, such as various types of seeds and fertilizers. Nevertheless, one or ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, a product distribution system on the air cart may pneumatically convey the granular product to the row units. For example, the metering assembly may control output of the granular product from a storage tank into an air stream, which is then delivered to the row units by a blower via pneumatic lines (e.g., including a primary line coupled to the air cart) that fluidly connects the metering assembly to the row units (e.g., via a distribution header coupled to secondary lines). During transitions between working and transport positions for the seeding implement, due to their length, the primary lines may get caught or crushed between components of the seeding implement.

Accordingly, as will be described in more detail below, embodiments described herein provide a system or apparatus for moving distribution lines of an agricultural product distribution system. Portions of the agricultural product distribution system may be located on an agricultural implement (e.g., seeder). The agricultural implement includes a frame including a center section and a first wing section and a second wing section flanking the center section, wherein the first wing section and the second wing section are configured to move relative to the center section during transitions between a folded position (e.g., transport position) and an unfolded position (e.g., working position). A first rigid tube assembly is disposed on the center section having a first set of rigid tubes and a second set of rigid tubes. A second rigid tube assembly is disposed on the first wing section and a third rigid tube assembly is disposed on the second wing section. A first set of flexibles hoses couples the first set of rigid tubes to the second rigid tube assembly and a second set of flexible hoses couples the second set of rigid tubes to the third rigid tube assembly. A structural support is disposed on the center section, wherein the first rigid tube assembly is disposed on the structural support, and the structural support is configured to enable movement of the first set of rigid tubes and the second set of rigid tubes relative to each other (e.g., toward and away from each other) during the transitions between the folded position and the unfolded position. The disclosed embodiments enable shorter hose lengths to be utilized for the sets of flexible of hoses. In addition, the multiple sets of flexible hoses are easier to replace than long hose sections typically associated with agricultural product distribution systems. Further, the routing of the distribution lines is neater. Even further, the distribution lines are kept from getting caught within portions of the frame (e.g., center section, the wing sections, linkages, etc.) during transitions between the folded and unfolded positions.

Turning now to the drawings, FIG. 1 is a side view of an embodiment of an agricultural material application system 100. As depicted, the agricultural material application system 100 (e.g., a seeding system or a planter system) includes an agricultural implement 110 (e.g., seeding implement or seeding toolbar) coupled to an air cart 10. In the depicted embodiment, the air cart 10 is towed behind the agricultural implement 110, relative to a direction of travel 112. In addition, the agricultural implement 110 is coupled to a work vehicle 114 by a first hitch system, and the air cart 10 is coupled to the agricultural implement 110 by a second hitch system 116. While the agricultural implement 110 is towed between the work vehicle 114 and the air cart 10 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 110 may deposit rows of seeds into the soil as the agricultural implement 110 is towed across a surface 118 of an agricultural field 120 by the work vehicle 114. The agricultural implement 110 includes a tool frame 122 coupled to a row unit 124 (e.g., a ground engaging opener system), a distribution header 126, a hose or line 128 (e.g., secondary distribution line), and wheel assemblies 130. The wheel assemblies 130 may contact the surface 118 to enable the agricultural implement 110 to be towed by the work vehicle 114. As the agricultural implement 110 moves in the direction of travel 112, a row of seeds may be deposited into the soil by the row unit 124. Although only one row unit 124 is shown, the agricultural implement 110 may include multiple row units 124 organized in a single row or multiple rows across the width of the agricultural implement 110. In some embodiments, the agricultural implement 110 may include a row of 12, 14, 16, 18, 20, or more row units 124, which may each deposit a respective row of seeds.

To facilitate depositing seeds, each row unit 124 includes an opener 132, a press wheel 134, a seed tube 136, and a hydraulic cylinder 138. In certain embodiments, a cutting disc may be utilized in place of the opener 132. In certain embodiments, a press wheel 134 may not be utilized. In certain embodiments, mechanical springs may be utilized for downforce instead of the hydraulic cylinder 138. When the opener 132 engages the soil, the opener 132 may exert a force that excavates a trench into the soil as the row unit 124 travels through the field. In the present embodiment, a position of the press wheel 134 controls the depth of the opener 132 and the hydraulic cylinder 138 controls the downward force (e.g., a down pressure). For example, the opener 132 may be controlled to establish a target depth of the trench. In certain embodiments, disc coulter openers may utilize a gauge wheel situated adjacent to a cutting disc to control the working depth of the opener 132. Seeds may then be deposited into the excavated trench via the seed tube 136. Then, the press wheel 134 may facilitate movement of the excavated soil into the trench to cover the seeds and compress the soil covering the seeds.

The air cart 10 may centrally store seeds and distribute the seeds to the row unit 124. Accordingly, the air cart 10 includes a metering assembly 140 (e.g., agricultural material meter), a storage tank 142, a frame 144, wheels 146, and an air source 20. In the depicted embodiment, the air cart frame 10 is coupled to the tool frame 122 via the hitch 116. The wheels 146 may contact the surface 118 to enable the air cart 10 to be towed along with the agricultural implement 110. Additionally, the storage tank 142 may centrally store the seeds for distribution. In some embodiments, the storage tank 142 may include multiple compartments or multiple tanks on a common frame for storing different types of granular materials. For example, a first compartment may store seeds while a second compartment may store a dry fertilizer. In such configurations, the air cart 10 may deliver both seed and fertilizer to the agricultural implement 110 via separate distribution systems, or as a mixture through a single distribution system.

Generally, the distribution system may control the amount of seeds distributed to the agricultural field 120, for example, using the metering assembly 140. For example, the metering assembly 140 may be controlled to increase or decrease the amount of seeds distributed to the agricultural field 120. As depicted, the metering assembly 140 is mounted to the bottom of the storage tank 142, which may enable the storage tank 142 to supply seeds to the metering assembly 140. The metering assembly 140 may then distribute the seeds to the distribution header 126 via a respective hose or line 148 (e.g., primary distribution line). In certain embodiments, the distribution system may include more than one primary hose 148. The distribution headers 126 may then distribute the seeds to one or more row units 124 via one or more hoses 128 (e.g., secondary distribution lines). In this manner, the metering assembly 140 may control distribution of seeds from the storage tank 142 to the row units 124 and into the trenches.

Figure 2:
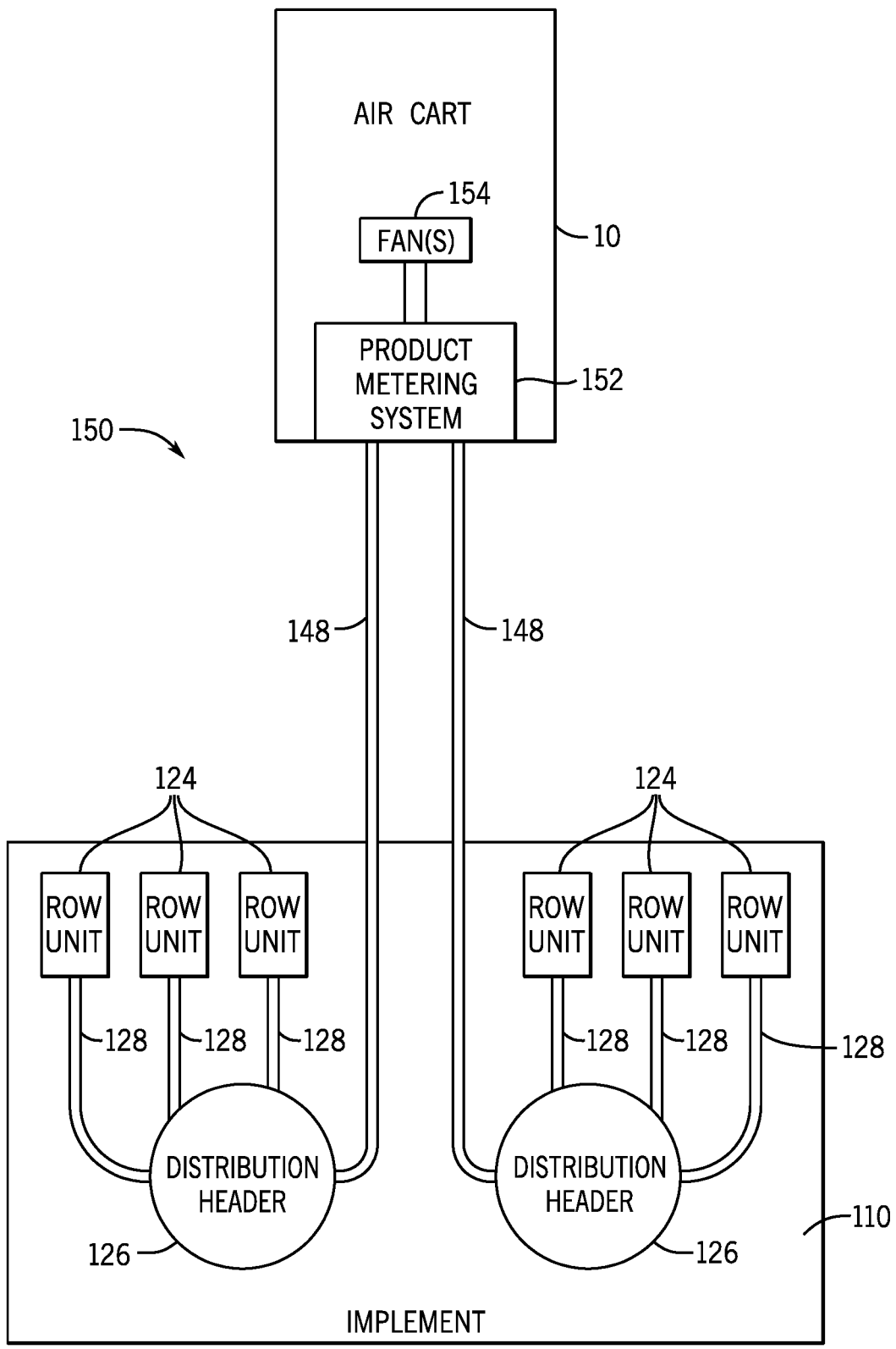
FIG. 2 is a schematic diagram of an air cart coupled to an implement, as shown in FIG. 1, in accordance with an embodiment.

FIG. 2 is a schematic diagram of the air cart 10 coupled to the implement 110, as shown in FIG. 1, illustrating a distribution system 150 (e.g., pneumatic conveyance system) including a product metering system 152 (e.g., metering assembly 140 in FIG. 1) that may be utilized with a system or apparatus for moving distribution lines (e.g., primary distribution lines). In the illustrated embodiment, the distribution system 150 includes the product metering system 152, the primary distribution hoses 148, distribution headers 126, and secondary distribution hoses 128. The granular agricultural product is delivered from the air cart 10 to the row units 124 using the distribution system 150. For example, the distribution system 150 transfers the agricultural product using the product metering system 152 to primary distribution hoses 148. Subsequently, the primary distribution hoses 148 transfer the agricultural product to the distribution headers 126 positioned on the implement 110. Finally, the distribution headers 26 transfer the product through the secondary distribution hoses 128 to deliver the product to the row units 124 of the implement 110.

The distribution system 150 includes one or more fans 154 for generating an air flow directed through a corresponding primary distribution hose 148. The granular product supplied to the primary distribution hose 148 from a storage compartment of the air cart 152 becomes entrained in the air flow through the primary distribution line 148 and is carried by the air flow downstream. In certain embodiments, each primary distribution hose 148 may be associated with a respective fan 154.

The air cart 10 may contain one product or multiple products that are transferred using the distribution system 150. For example, certain distribution systems 150 are configured to mix multiple products, and transfer the products together to the row units 124. Such systems may be known as "single shoot" distribution systems 150. Alternatively, certain distribution systems 150 are configured to transfer product separately to the row units 124. Such systems may be known as "double shoot" systems 150. The air cart 10, as shown in FIG. 2, includes a single shoot distribution system 150. However, other embodiments within the scope of this disclosure may include double shoot distribution systems 150.

The product metering system 152 controls the rate at which product is transferred to the primary distribution hoses 148. For example, the product metering system 50 may contain one or more meter rollers that transfer the product from the air cart 10 to the primary distribution hoses 148. In configurations that employ multiple meter rollers, the meter rollers may be configured to operate collectively or individually. For example, if the implement 110 passes over a swath of soil that is partially planted, the distribution system 150 may activate certain meter rollers to deliver product to row units 124 in the unplanted sections while deactivating other meter rollers to block product delivery to row units 124 in the planted sections. In this manner, the implement 110 may provide a substantially even distribution of product to the soil, thereby substantially reducing wasted product associated with double-planting certain areas of the soil. In addition, the meter rollers may also contain a holding chamber to provide a steady flow of product to the primary distribution hoses 126.

The primary distribution hoses 148 are coupled to the product metering system 152 and configured to receive product from the product metering system 152. Although two primary distribution hoses 148 are depicted, any suitable number of hoses may be used. For example, some embodiments may only use one primary distribution hose 148, while other embodiments use 3, 4, 5, 6, 7, 8, 9, 10 or more primary distribution hoses 148. The number and length of primary distribution hoses 148 may be at least partially dependent on the output of an air source, the type of product being used, and/or the configuration of the implement 110 connected to the primary distribution hoses 148.

The distribution headers 126 receive the product from the primary distribution hoses 148. Generally, the number of distribution headers 126 matches the number of primary distribution hoses 148. However, some embodiments may incorporate multiple primary distribution hoses 148 into a single distribution header 126, or one primary distribution hose 148 may be coupled to multiple distribution headers 126. In addition, there may be any suitable number of distribution headers 126. For example, some embodiments may use only one distribution header 126, while other embodiments use 3, 4, 5, 6, 7, 8, 9, 10 or more distribution headers 126. The distribution headers 126 distribute the product along the secondary distribution hoses 128. While three secondary distribution hoses 128 are depicted for each of the distribution headers 126, any suitable number of the secondary distribution hoses 128 may be used.

The secondary distribution hoses 128 provide a flow path for the product to be transferred from the distribution header 126 to the row units 124. Generally there is a secondary distribution hose 128 for each row unit 124. However, there may be multiple secondary distribution hoses 128 going to a single row unit 124, or one secondary distribution hose 128 may provide product to multiple row units 124. For example, a double shoot system, where multiple products are transferred separately, may have multiple secondary distribution hoses 128 going to a single row unit 124.

In certain embodiments, the distribution system 150 enables individual or combined control of product distribution from the air cart 10 to the primary distribution hoses 148. For example, the distribution system 150 may individually stop, start, and/or regulate product delivery rates for each primary distribution hose 148. In addition, the distribution system 150 may block the flow of product when portions of the product metering system 152 are stopped.

Figure 3:
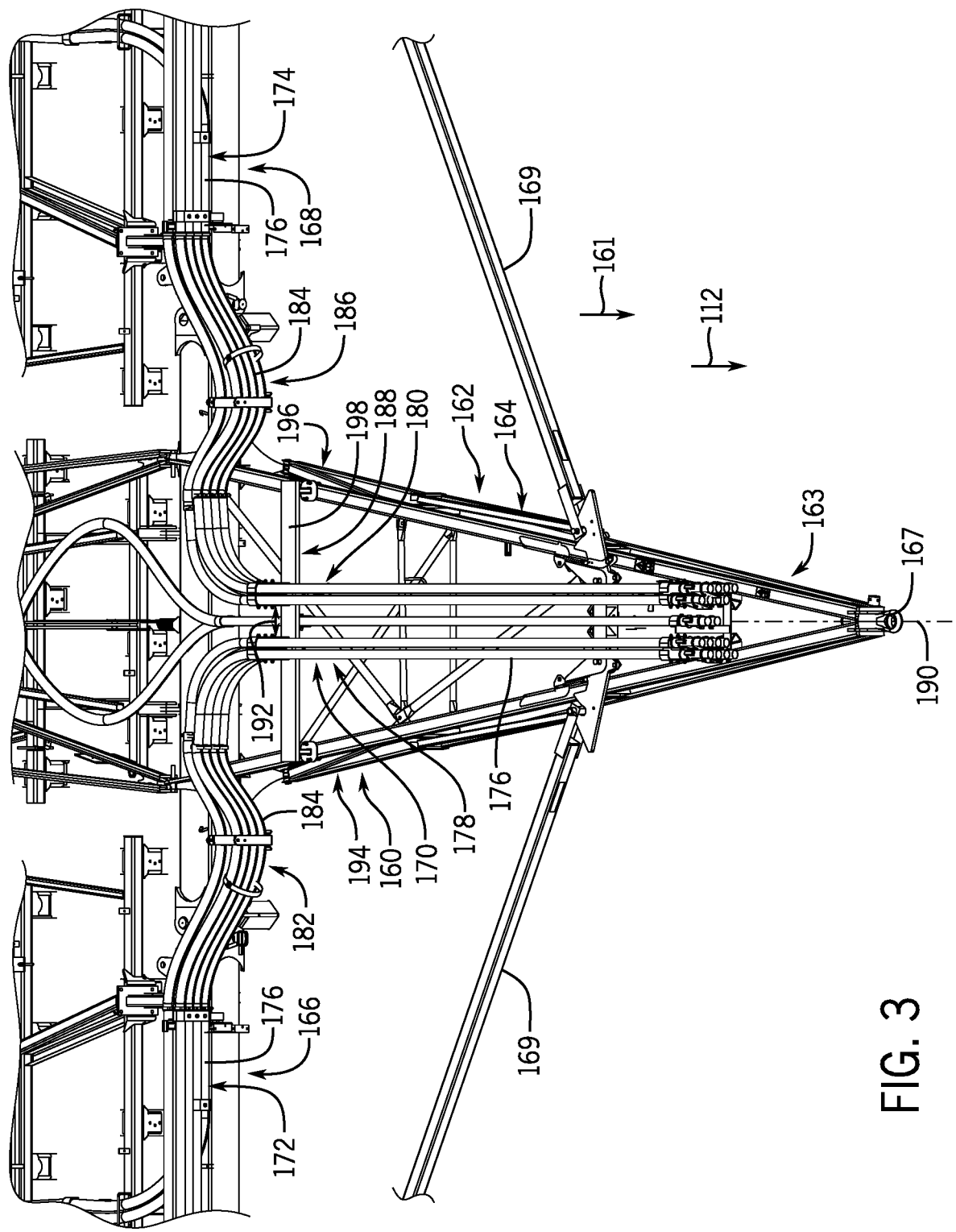
FIG. 3 is a perspective view of a portion of an agricultural implement having an apparatus for moving distribution lines, in accordance with an embodiment.
Figure 4:
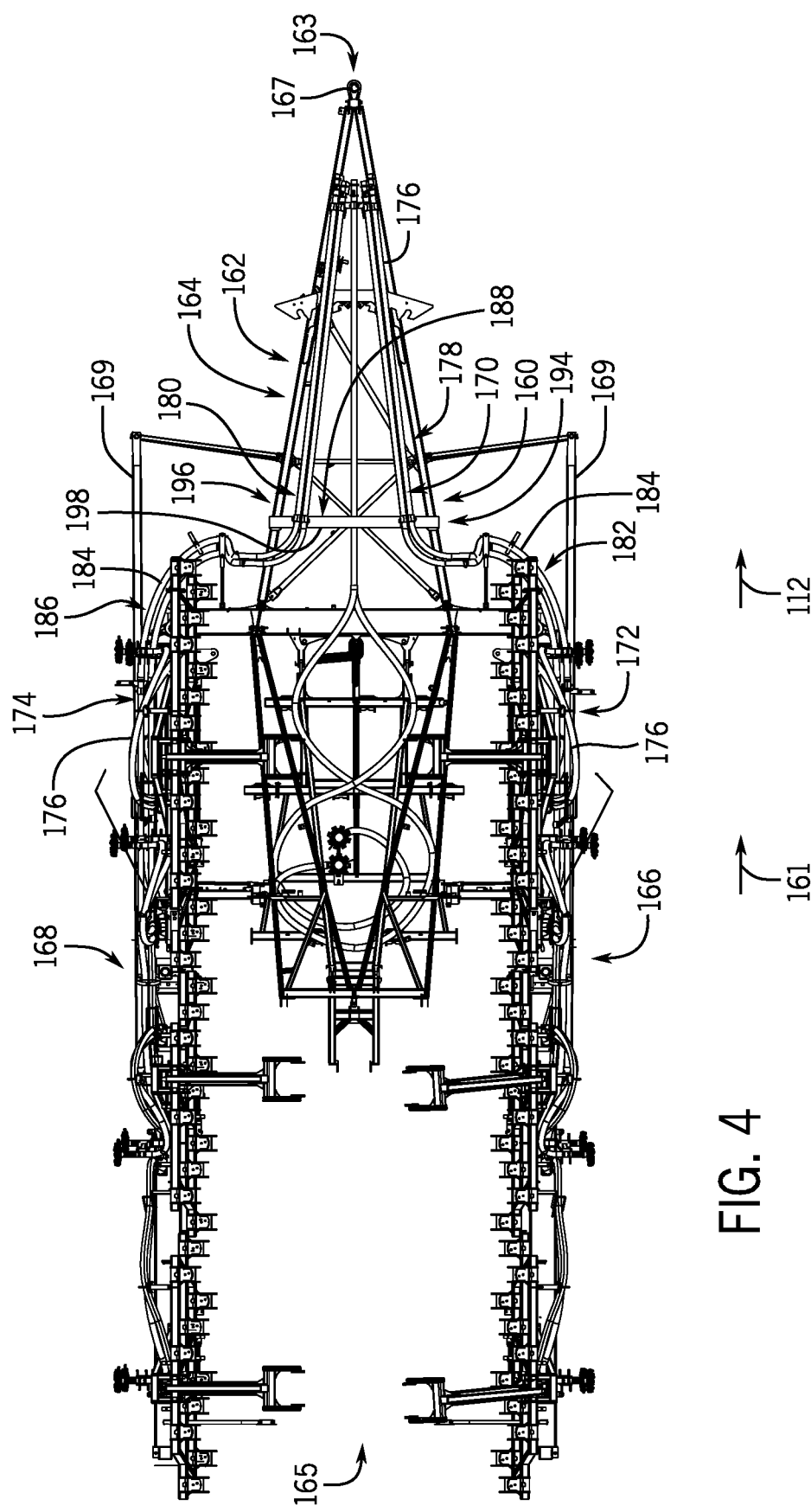
FIG. 4 is a top view of the agricultural implement in FIG. 3 (e.g., in a folded position), in accordance with an embodiment.

FIG. 3 is a perspective view of a portion of the agricultural implement 110 (e.g., seeding implement or seeding toolbar) having an apparatus or system 160 (that forms a portion of the distribution system 150 in FIG. 2) for moving distribution lines on the agricultural implement 110. The agricultural implement 110 includes a frame 162 having center section 164 flanked by wings sections 166, 168 (see FIGS. 4 and 5). Linkages 169 couple the center section 164 to the wing sections 166, 168. The frame 162 generally includes a plurality of structural frame members, such as beams, bars, and/or the like, configured to support or couple to a plurality of components. The wings sections 166, 168 move (or pivot) relative to the center section 164. In a folded position (see FIG. 4), the agricultural implement 110 is in a transport mode to enable the implement 110 to be moved from one location to another location (e.g. on a road) without the implement 110 being utilized to distribute an agricultural product. In the folded position, the longitudinal lengths of the wing sections 166, 168 are oriented parallel to the longitudinal length of the center section 164 as depicted in FIG. 4. In the unfolded position (see FIG. 5), the agricultural implement 110 is in a working position to enable the implement 110 to distribute an agricultural product. In an unfolded position, the longitudinal lengths of the wing sections 166, 168 extend perpendicular to the longitudinal length of the center section 164 as depicted in FIG. 5.

Figure 5:
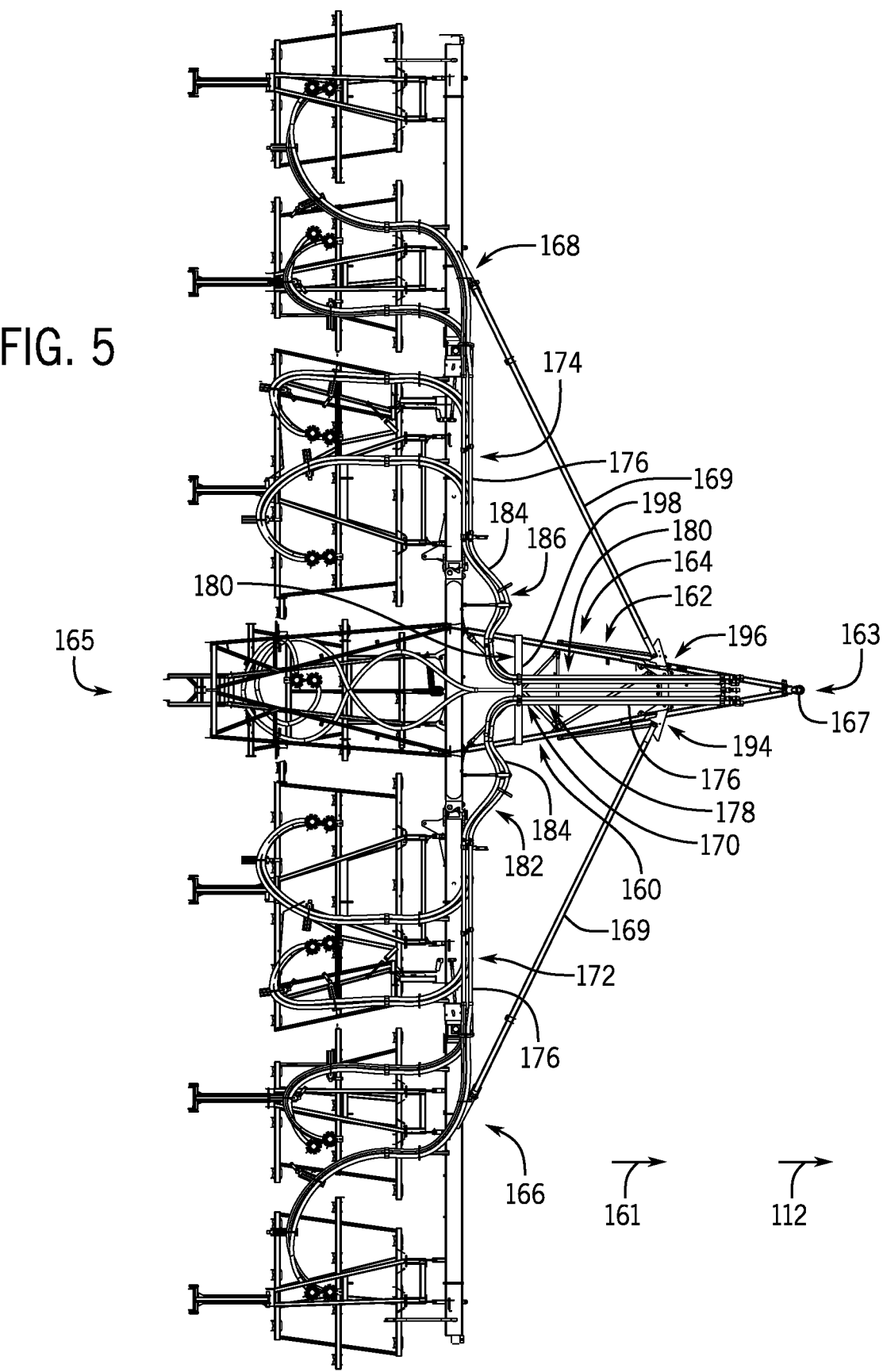
FIG. 5 is a top view of the agricultural implement in FIG. 3 (e.g., in an unfolded position), in accordance with an embodiment.

Returning to FIG. 3, the frame 162 extends in a longitudinal direction (as indicated by arrow 161) between a forward end 163 and a rear end 165 (see FIGS. 4 and 5). The frame 162 includes a hitch assembly 167 on the forward end 163 to couple the implement 110 to an air cart (e.g., air cart 10 in FIGS. 1 and 2).

The system 160 includes rigid tube assemblies 170, 172, 174 disposed on the center section 164, the wing section 166, and the wing section 168, respectively. Each rigid tube assembly 170, 172, 174 includes a plurality of rigid tubes 176. The number of rigid tubes 176 may vary (e.g., 1, 2, 3, 4, or more). The rigid tube assembly 170 includes a first set 178 of rigid tubes 176 and a second set 180 of rigid tubes 176. The system 160 also includes a first set 182 of flexible hoses 184 and a second set 186 of flexible hoses 184. The first set 178 of rigid tubes 176 is coupled to the rigid tube assembly 172 via the first set 182 of flexible hoses 184. The second set 180 of rigid tubes 176 is coupled to the rigid tube assembly 174 via the second set 186 of flexible hoses 184. Each hose 184 of the first set 182 of the flexible hoses 184 is coupled to corresponding rigid tubes 176 of the rigid tube assemblies 170, 172. Each hose 184 of the second set 186 of flexible hoses 184 is coupled to corresponding rigid tubes 176 of the rigid tube assemblies 170, 174. The hoses 184 extend between the center section 164 and the respective wings sections 166, 168. The rigid tubes 176 and the flexible hoses 184 form portions of the primary distribution lines (e.g., primary distribution lines 148 in FIG. 2).

Figure 6:
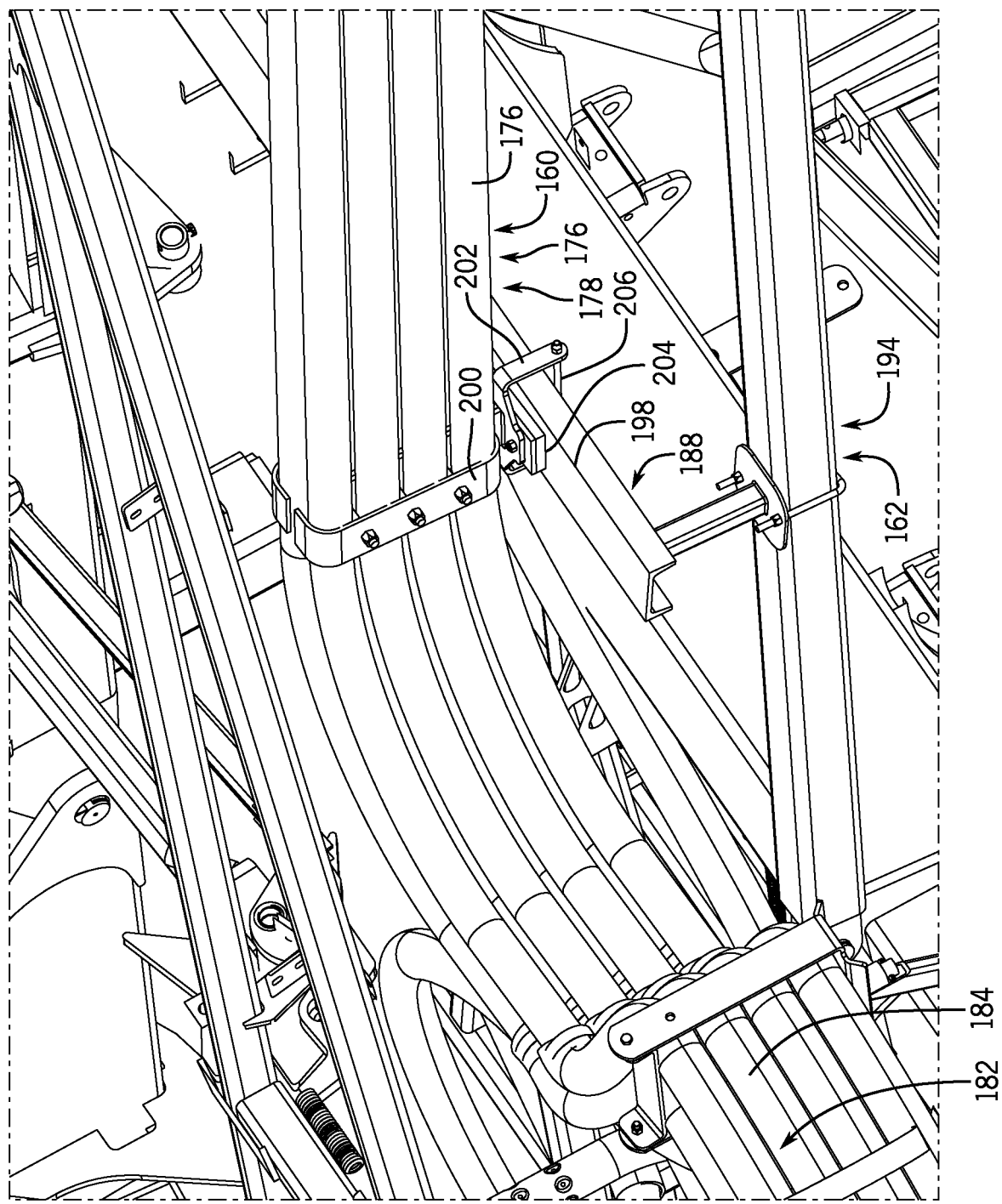
FIG. 6 is a perspective of a portion of the agricultural implement in FIG. 3 (e.g., illustrating a rigid tub assembly on a structural support), in accordance with an embodiment.

The system 160 also includes a structural support 188 disposed on the center section 164. A portion of both sets 178, 180 of rigid tubes 176 are disposed on the structural support 188. The structural support 188 is configured to enable movement of the first set 178 of rigid tubes 176 and the second set 180 of rigid tubes 176 toward and away from each other (and a centerline 190 of the center section 164) as indicated by arrow 192. In particular, in a transition from the folded position to the unfolded position, the sets 178, 180 of rigid tubes 176 move toward each other. In a transition from the unfolded position to the folded position, the sets 178, 180 of rigid tubes 176 move away from each other (see FIG. 4). The structural support 188 is configured to keep the first set 182 of flexible hoses 184 and the second set 186 of flexible hoses 184 from getting caught between the center section 162 and the wing section 166 and the second wing section 168, respectively, and caught within linkages 169 coupling the center section 162 to first wing section 166 and the second wing section 168 during the transitions between a folded position and an unfolded position The structural support 188 extends between side 194 of the center section 164 adjacent the wing section 166 and side 196 of the center section 164 adjacent the wing section 168. The structural support 188 serves as a track 198 for the sliding of the sets 178, 180 of rigid tubes 176. In particular, as depicted in FIG. 6, a clamp or bracket 200 is disposed about the rigid tubes 176 of the set 178 of rigid tubes 176. A bottom portion of the clamp or bracket 200 includes a fork portion 202 coupled to wear pad 204 (e.g., steel wear pad) that slides along the track 198. A fastener 206 (e.g., pin or bolt) is disposed through the fork portion 202 underneath the structural support 188 to secure the set 178 of rigid tubes 176 to the support structure 188. Although not shown in FIG. 6, a respective clamp or bracket 200 with fork portion 202 and wear pad 204 couples the set 180 of rigid tubes 176 to the support structure 188 and enables the set 180 of rigid tubes 176 to move along the track 198.

In certain embodiments, the structural support 188 may not be a track. FIG. 7 is schematic top view of the rigid tube assembly 170 coupled to the frame 162 via the structural support 188 (for simplicity other components of the agricultural implement are not shown). The structural support 188 includes an arm 208 that extends between and couples a portion of the center section 164 of the frame 162 to the rigid tube assembly 170 (e.g., the first set 178 of rigid tubes 176). The arm 208 rotates (as indicated by arrow 210) about a vertical axis 212 to enable movement of the rigid tube assembly 170 (e.g., of the first set 178 of rigid tubes 76 towards and away from the second set 180 of rigid tubes 176). The same type of structural support 188 may be utilized with the second set 180 of rigid tubes 176 in FIGS. 3-5.

FIG. 8 is schematic end view of the rigid tube assembly 170 coupled to the frame 162 via the structural support 188 (for simplicity other components of the agricultural implement are not shown). The structural support 188 includes an arm 214 that extends between and couples a portion of the center section 164 of the frame 162 to the rigid tube assembly 170 (e.g., the first set 178 of rigid tubes 176). The arm 214 rotates (as indicated by arrow 216) about a horizontal axis 218 to enable movement of the rigid tube assembly 170 (e.g., of the first set 178 of rigid tubes 76 towards and away from the second set 180 of rigid tubes 176). The same type of structural support 188 may be utilized with the second set 180 of rigid tubes 176 in FIGS. 3-5.

Figure 10:
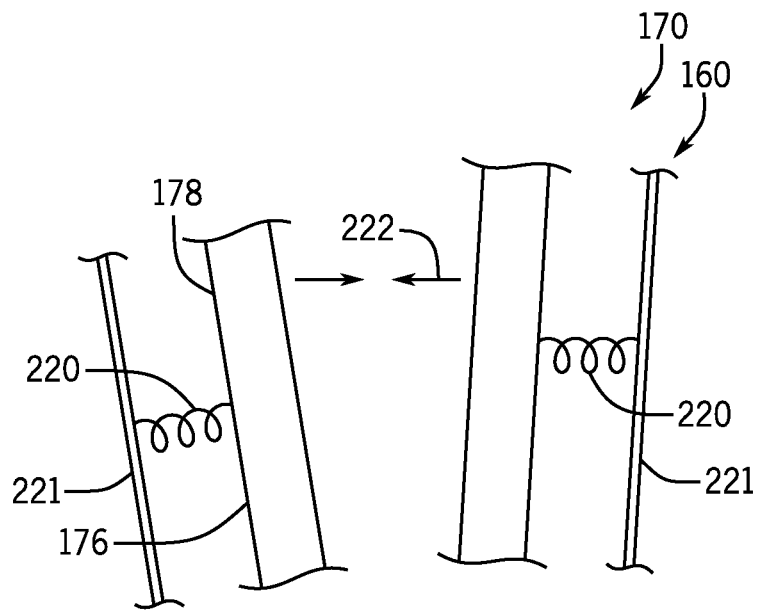
FIG. 10 is a schematic top view of springs disposed between a rigid tube assembly and frame portions of a center section of a frame of an agricultural implement, in accordance with an embodiment.

The system 160 may include other components to assist movement of the distribution lines instead of relying on the stiffness of the hose to push the rigid tube assembly 170 inward. FIG. 9 is a schematic top view of the rigid tube assembly 170 having a spring 220 (e.g., tension or compression spring). The spring 220 is disposed between the first set 178 of rigid tubes 176 and the second set 180 of rigid tubes 176. The spring 220 biases the first 178 of rigid tubes 176 and the second set 180 of rigid tubes 176 toward each other as indicated by arrows 222. In certain embodiments, more than one spring 220 may be disposed between the first set 178 of rigid tubes 176 and the second set 180 of rigid tubes 176. In certain embodiments (as depicted in FIG. 10), respective springs 220 may be disposed between outer frame portions 221 of the center section (flanking the first and second sets 178, 180 of rigid tubes 176) and the first set 178 of rigid tubes 176 and the second set 180 of rigid tubes 176, respectively.

Figure 11:
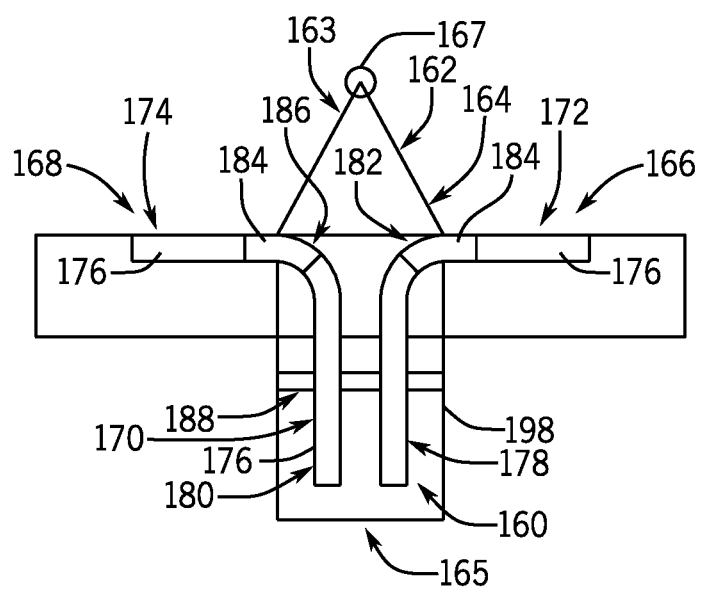
FIG. 11 is a schematic top view of an agricultural implement having an apparatus for moving distribution lines along a rear portion, in accordance with an embodiment.

As depicted in FIGS. 3-5, the system 160 is disposed adjacent the front end 163 of the agricultural implement 110 (where the implement 110 is being towed behind an air cart). In certain embodiments, the air cart is towed behind the agricultural implement 110. In this embodiment, as depicted in FIG. 11, the rigid tube assembly 170 and the support structure 188 are located on the center section 114 adjacent the rear portion 165 of the agricultural implement 110 (behind the wing sections 166, 168). Still, in a transition from the folded position to the unfolded position, the sets 178, 180 of rigid tubes 176 move toward each other. In a transition from the unfolded position to the folded position, the sets 178, 180 of rigid tubes 176 move away from each other.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An agricultural implement for an agricultural product distribution system, comprising:
 a frame comprising a center section and a first wing section and a second wing section flanking the center section, wherein the first wing section and the second wing section are configured to move relative to the center section during transitions between a folded position and an unfolded position;
 a first rigid tube assembly disposed on the center section having a first set of rigid tubes and a second set of rigid tubes;
 a second rigid tube assembly disposed on the first wing section;
 a third rigid tube assembly disposed on the second wing section;
 a first set of flexibles hoses coupling the first set of rigid tubes to the second rigid tube assembly;
 a second set of flexible hoses coupling the second set of rigid tubes to the third rigid tube assembly; and
 a structural support disposed on the center section, wherein the first rigid tube assembly is disposed on the structural support, and the structural support is configured to enable movement of the first set of rigid tubes and the second set of rigid tubes relative to the center section and each other during the transitions between the folded position and the unfolded position.

2. The agricultural implement of claim 1, wherein the structural support comprises a track extending from adjacent a first side of the center section adjacent the first wing section to adjacent a second side of the center section adjacent the second wing section, and the first set of rigid tubes and the second set of rigid tubes are configured to slide along the track.

3. The agricultural implement of claim 1, wherein the structural support comprises a first arm coupled to both the center section and the first set of rigid tubes and a second arm coupled to both the center section and the second set of rigid tubes, and the first arm and the second arm are configured to rotate about a horizontal or vertical axis to enable movement of the first set of rigid tubes and the second set of rigid tubes relative to each other.

4. The agricultural implement of claim 1, wherein the unfolded position comprises a working position for the agricultural implement to enable distribution of an agricultural product and the folded position comprises a transport position to enable the transport of the agricultural implement between different locations when the agricultural implement is not utilized for the distribution of the agricultural product.

5. The agricultural implement of claim 1, wherein the structural support is configured to keep the first set of flexible hoses and the second set of flexible hoses from getting caught between the center section and the first wing section and the second wing section, respectively, and caught within linkages coupling the center section to the first wing section and the second wing section during the transitions between a folded position and an unfolded position.

6. The agricultural implement of claim 1, wherein the first set of rigid tubes and the second set of rigid tubes are configured to move toward each during a first transition from the folded position to the unfolded position and to move away from each other during a second transition from the unfolded position to the folded position.

7. The agricultural implement of claim 1, wherein the frame comprises a hitch disposed on a front portion of the center section relative to a direction of travel of the agricultural implement and the structural support is axially located between the hitch and the first and second wing sections.

8. The agricultural implement of claim 1, wherein the frame comprises a hitch disposed on a front portion of the center section relative to a direction of travel of the agricultural implement and the structural support is axially located on a rear portion of the center section behind the first and second wing sections.

9. The agricultural implement of claim 1, comprising a spring located between the first set of rigid tubes and the second set of rigid tubes to bias the first set of rigid tubes and the second set of rigid tubes to move toward each other.

10. The agricultural implement of claim 1, comprising a first spring located between the first set of rigid tubes and a first frame portion of the center section and a second spring located between the second set of rigid tubes and a second frame portion of the center section, wherein the first frame portion and the second frame portion flank the first set of rigid tubes and the second set of rigid tubes, and the first spring and the second spring are configured to bias the first set of rigid tubes and the second set of rigid tubes to move toward each other.

11. An agricultural product distribution system, comprising:
a first rigid tube assembly configured to be disposed on a center section of a frame of an agricultural implement, the frame comprising the center section and a first wing section and a second wing section flanking the center section, and the first wing section and the second wing section being configured to move relative to the central section during transitions between a folded position and an unfolded position, wherein the first rigid tube assembly has a first set of rigid tubes and a second set of rigid tubes;
a second rigid tube assembly configured to be disposed on the first wing section and coupled to the first set of rigid tubes;
a third rigid tube assembly configured to be disposed on the second wing section and coupled to the second set of rigid tubes; and
a structural support configured to be disposed on the center section, wherein the first rigid tube assembly is disposed on the structural support, and the structural support is configured to enable movement of the first set of rigid tubes and the second set of rigid tubes relative to the center section and each other during the transitions between the folded position the unfolded position.

12. The agricultural product distribution system of claim 11, comprising a first set of flexibles hoses coupling the first set of rigid tubes to the second rigid tube assembly, and a second set of flexible hoses coupling the second set of rigid tubes to the third rigid tube assembly.

13. The agricultural product distribution system of claim 11, wherein the structural support is configured to keep the first set of flexible hoses and the second set of flexible hoses from getting caught between the center section and the first wing section and the second wing section, respectively, and caught within linkages coupling the center section to the first wing section and the second wing section during the transitions between a folded position and an unfolded position.

14. The agricultural product distribution system of claim 11, wherein the structural support comprises a track configured to extend from adjacent a first side of the center section adjacent the first wing section to adjacent a second side of the center section adjacent the second wing section, and the first set of rigid tubes and the second set of rigid tubes are configured to slide along the track.

15. The agricultural product distribution system of claim 11, wherein the structural support comprises a first arm configured to couple both to the center section and the first set of rigid tubes and a second arm configured to couple to both the center section and the second set of rigid tubes, and the first arm and the second arm are configured to rotate about a horizontal or vertical axis to enable movement of the first set of rigid tubes and the second set of rigid tubes relative to each other.

16. The agricultural product distribution system of claim 11, wherein the unfolded position comprises a working position for the agricultural implement to enable distribution of an agricultural product and the folded position comprises a transport position to enable the transport of the agricultural implement between different locations when the agricultural implement is not utilized for the distribution of the agricultural product.

17. The agricultural product distribution system of claim 11, wherein the first set of rigid tubes and the second set of rigid tubes are configured to move toward each during a first transition from the folded position to the unfolded position and to move away from each other during a second transition from the unfolded position to the folded position.

18. A system for movement of distribution lines of an agricultural product distribution system, comprising:

a first rigid tube assembly configured to be disposed on a center section of a frame of an agricultural implement, the frame comprising the center section and a first wing section and a second wing section flanking the center section, the first wing section and the second wing section being configured to move relative to the central section during transitions between a folded position and an unfolded position, wherein the first rigid tube assembly has a first set of rigid tubes and a second set of rigid tubes;

a second rigid tube assembly configured to be disposed on the first wing section and coupled to the first set of rigid tubes;

a third rigid tube assembly configured to be disposed on the second wing section and coupled to the second set of rigid tubes; and a track configured to be disposed on the center section, wherein the first rigid tube assembly is disposed on a structural support, and the first set of rigid tubes and the second set of rigid tubes are configured to move relative to the center section and each other by sliding on the track during the transitions between the folded position the unfolded position.

19. The system of claim 18, comprising a first set of flexibles hoses coupling the first set of rigid tubes to the second rigid tube assembly, and a second set of flexible hoses coupling the second set of rigid tubes to the third rigid tube assembly.

20. The system of claim 18, wherein the first set of rigid tubes and the second set of rigid tubes are configured to move toward each during a first transition from the folded position to the unfolded position and to move away from each other during a second transition from the unfolded position to the folded position.

\* \* \* \* \*